United States Patent [19]
Panella

[11] 3,919,841
[45] Nov. 18, 1975

[54] ROCKET MOTOR APPARATUS
[75] Inventor: Edward A. Panella, Ridgecrest, Calif.
[73] Assignee: The United States of America as represented by the Secretary of the Navy, Washington, D.C.
[22] Filed: July 5, 1974
[21] Appl. No.: 486,248

[52] U.S. Cl. ................................................. 60/255
[51] Int. Cl.² ......................................... F02K 9/04
[58] Field of Search ....... 60/255, 253, 39.47, 200 A

[56] References Cited
UNITED STATES PATENTS
2,957,309  10/1960  Kobbeman ........................... 60/225
3,407,595  10/1968  Peterson ............................ 60/39.47
3,440,820  4/1969   Caveny ............................... 60/253
3,849,983  11/1974  Cherry ................................ 60/255

Primary Examiner—Samuel Feinberg
Attorney, Agent, or Firm—R. S. Sciascia; Roy Miller; Lloyd E. K. Pohl

[57] ABSTRACT

A plurality of perforated tubes are placed longitudinally between the insulator layer and silicone rubber layer of a stress relieving rocket motor liner to insure proper pressure distribution within the motor during burn.

3 Claims, 2 Drawing Figures

ROCKET MOTOR APPARATUS

BACKGROUND OF THE INVENTION

1. Field of the Invention

This invention relates to stress relieving rocket motor liners. More particularly, this invention relates to stress relieving rocket motor liners for motors utilizing end burning solid propellant grains and in which the motor pressure can be changed during flight.

2. Description of the Prior Art

Rocket motors which utilize end burning solid propellant grains and in which the chamber pressure can be changed during flight are known. One way to change the chamber pressure during flight is to utilize a pintle which is inserted into the nozzle throat to decrease the throat area and increase the internal pressure of the motor. In this way, what is commonly called a re-boost stage is achieved.

In rocket motors of the type which utilize end burning solid propellant grains as well as in other types of rocket motors, a stress relieving liner comprising an insulator layer adjacent to and bonded to the motor case, a silicone rubber layer adjacent to the insulator layer and an inhibitor layer inside of and adjacent to the silicone rubber layer and bonded to the outer periphery of the solid propellant grain is commonly used. The insulator layer is bonded to the inhibitor layer by means of columns extending through perforations in the silicone rubber. These columns act somewhat like bands and allow the propellant grain within the motor to either shrink or expand without cracking. Materials from which the insulator layer and inhibitor layer may be fabricated are well known in the art and need not be gone into here. The silicone rubber layer is intended to be unbonded to the adjacent layers.

When an end burning solid propellant grain is burned within a rocket motor utilizing a stress relieving liner of the type described above, the insulator layer of the liner does not burn. It remains in place, adjacent to the motor case, providing its function, i.e., insulation. The silicone rubber layer does, on the other hand, burn but it burns at a slower rate than does the propellant grain. In a like manner, the inhibitor layer burns at a slower rate than a grain. Therefore, at any moment during the burn of the propellant grain (after initiation) the motor has an insulation layer still extending the full length of the motor, a partially consumed tube of silicone rubber extending out behind the burning end of the propellant grain and a partially consumed tube of inhibitor extending out behind the burning end of the propellant grain. In rocket motors wherein the internal pressure is changed during flight, the rearwardly extending tubes or flaps of silicone rubber and inhibitor cause pressure equalization problems.

As the propellant burns exhaust gases seeping forward between the various layers of the liner attempt to maintain equal gas pressure throughout the motor. As long as chamber pressure remains relatively constant, this equalization is possible with a small amount of gas seepage. However, when pressure is suddenly increased (as it is when a pintle is inserted into the throat area of the nozzle), the tubes or flaps of material extending rearwardly from the end of the propellant grain interfere with the relatively large amount of gas seeping forward required to equalize pressure. When this happens and the pressure difference across the extended inhibitor layer becomes such as to cause the inhibitor to be stripped from the side of the propellant grain, motor blowups can occur.

SUMMARY OF THE INVENTION

According to the present invention, the aforementioned problem is overcome by utilizing perforated tubes which are inserted longitudinally between the insulator layer and the silicone rubber release sheet. The tubes insure proper gas seepage, i.e., insure equal pressure distribution across the inhibitor flap and thus obviate propellant grain unbonding. That is, the inhibitor is prevented from peeling off of the propellant grain.

DESCRIPTION OF THE PREFERRED EMBODIMENT

Figure 1:
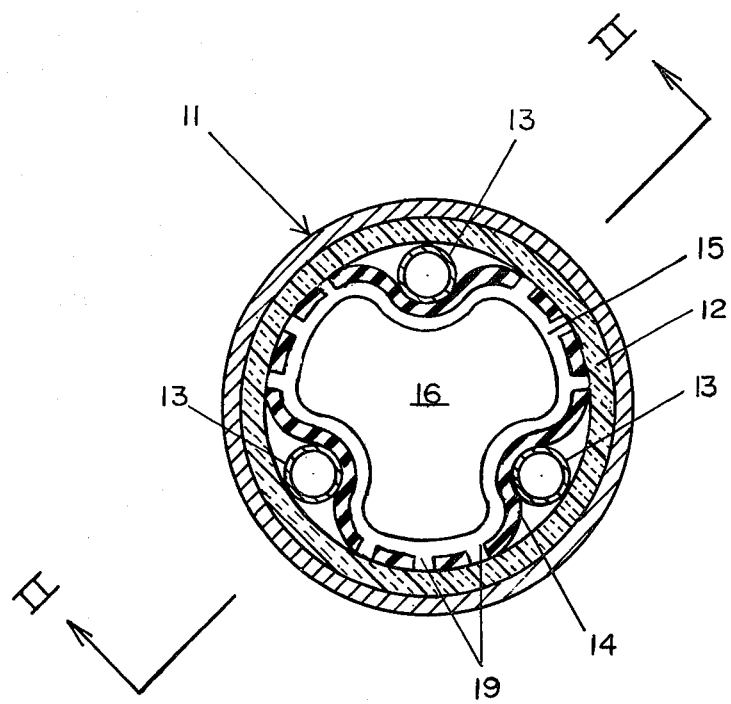
FIG. 1 of the drawing is a transverse cross sectional view of a rocket motor having a liner according to this invention.

In FIG. 1 of the drawing, a tubular rocket motor case is indicated by the numeral 11. Just inside and bonded to the motor case is an insulator layer 12. Laying on the inner surface of the insulator layer are three tubes 13. Interior to and adjacent to the insulator layer and tubes is a silicone rubber layer 14. Interior to and at places passing through the silicone rubber layer is an inhibitor layer 15. Columns of inhibitor material which bond to the insulator layer are indicated by the numeral 19. Interior to and bonded to the inhibitor layer is an end burning solid propellant grain 16.

In the practice of this invention, the insulator layer 12, the inhibitor layer 15 and the end burning propellant grain 16 may be of any materials commonly utilized in the fabrication of such items. The silicone rubber layer 14 is perforated or interrupted in order to allow the inhibitor layer and insulator layer to bond together by means of columns 19.

It is preferred that the tubes 13 be asbestos phenolic. However, they may be fabricated from other materials which either burn more slowly than the propellant or do not burn at all.

Tubes 13 are perforated. The perforations are not shown on FIG. 1. That is, a plurality of openings are provided to extend from the outer periphery of the tubes into the interior of the tubes. The reason for providing perforations will become clear from reading the following discussion.

Figure 2:
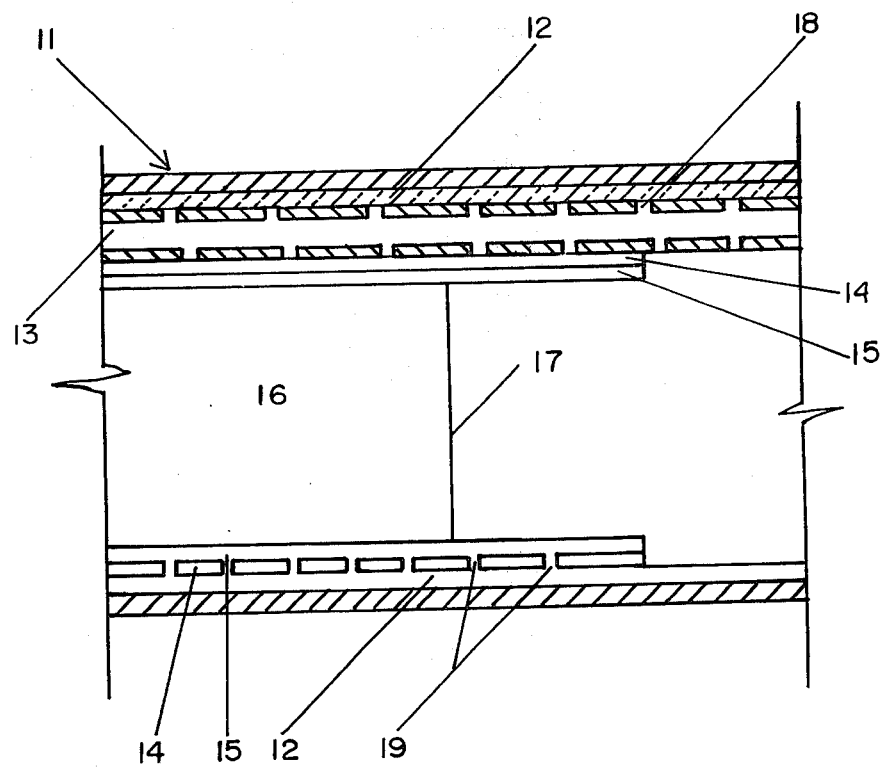
FIG. 2 is a longitudinal cross sectional view of a portion of the motor of FIG. 1 at a point after initiation and before completion of the burn.

When an end burning propellant grain encased in a liner of the type shown in the drawing is burned, the motor will appear in logitudinal cross section, at sometime during the burn, as in FIG. 2. The motor case 11 (nozzle not shown) will extend rearwardly (toward the nozzle end) from the burning end 17 of grain 16. Insulator 12 will also extend rearwardly from the burning end 17 of grain 16. Insulator 12 will also extend rearwardly from the burning end 17 of the grain as will tubes 13 and flaps or tubes of the silicone rubber layer 14 and inhibitor 15. It is these flaps or tubes of inhibitor and silicone rubber that have, in the prior art, interfered with the proper distribution of pressure in the motor when pressure was increased in a motor utilizing a pintle (not shown) or some other method to cause the pressure to change rapidly.

In the present invention, interference by the flaps or tubes of silicone rubber and inhibitor, is overcome by the utilization of tubes 13. In FIG. 2, tube 13 is shown as having a plurality of perforations 18 as spoken of above. During burn, gas seeps into the tubes through perforations 18 and through the open end (not shown in FIG. 2) and moves forward and outward from the tube through perforations 18. Pressure difference is prevented from occuring across the inhibitor layer thus allowing it to remain bonded to the propellant grain. It might be noted here that in tests of motors utilizing liners of the type discussed herein but without tubes 13, blowups believed to have been caused by the inhibitor layer peeling away from the propellant grain occurred. The tubes of this invention, by insuring proper pressure distribution within the motor, prevent such blowups.

In FIG. 2, tube 13 is shown as extending much further to the rear of the burning end 17 of the propellant grain than do flaps or tubes 14 and 15. Presumably, tube 13, like insulator 12, is not burning. This is the case when asbestos phenolic is used to fabricate the tubes. However, it is permissible for tubes 13 to burn as long as they burn more slowly than the propellant and as slow or more slowly than the silicone rubber and inhibitor layers. It is to be realized that the open rear end of the tubes as well as the perforations provide means of entry for gases. That is the reason why the tubes may burn at the same rate as the silicone rubber and inhibitor layers.

FIG. 1 of the drawing shows three perforated tubes. It is to be realized that the size and number of tubes as well as the size and number of tube perforations can be provided based on known methods of calculating gas flow considering the degree of chamber pressure change expected in the particular motor design.

What is claimed is:

1. A stress relieving rocket motor liner comprising:
   a. an insulator layer adjacent to and bonded to the motor case;
   b. a plurality of perforated tubes extending longitudinally along and adjacent to the insulator layer;
   c. a perforated layer of silicone rubber inside of and adjacent to the inner surfaces of the insulator layer and tubes; and
   d. an inhibitor layer inside of and adjacent to the layer of silicone rubber, said inhibitor layer being outside of, adjacent to and bonded to a solid propellant grain and said inhibitor layer being bonded to said insulator layer by means of columns extending through the perforations in the silicone rubber layer.

2. A stress relieving liner according to claim 1 wherein the perforated tubes are fabricated from asbestos phenolic.

3. A stress relieving liner according to claim 1 in which the inhibitor layer is bonded to an end burning solid propellant grain.

* * * * *